Sept. 2, 1924.

R. E. HELLMUND

PROTECTIVE APPARATUS FOR GENERATORS

Filed April 9, 1918

1,506,749

2 Sheets—Sheet 1

WITNESSES:
Ed. V. Herron
D. C. Davis

INVENTOR
Rudolf E. Hellmund
BY
Wesley G. Carr
ATTORNEY

Patented Sept. 2, 1924.

1,506,749

UNITED STATES PATENT OFFICE.

RUDOLF E. HELLMUND, OF SWISSVALE, PENNSYLVANIA, ASSIGNOR TO WESTING-HOUSE ELECTRIC AND MANUFACTURING COMPANY, A CORPORATION OF PENNSYLVANIA.

PROTECTIVE APPARATUS FOR GENERATORS.

Application filed April 9, 1918. Serial No. 227,420.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Protective Apparatus for Generators, of which the following is a specification.

My invention relates to protective methods and apparatus for generators, such, for example, as are employed in substations for supplying high-voltage, direct current to railway systems, and it has for its object to provide means whereby, upon the occurrence of a slight degree of overload, a negative compounding characteristic shall be imparted to the generator and, upon the application of a more pronounced overload, the excitation of the generator shall be entirely removed, whereby said generator shall be effectually protected from the disastrous effects of overload.

Figure 1:
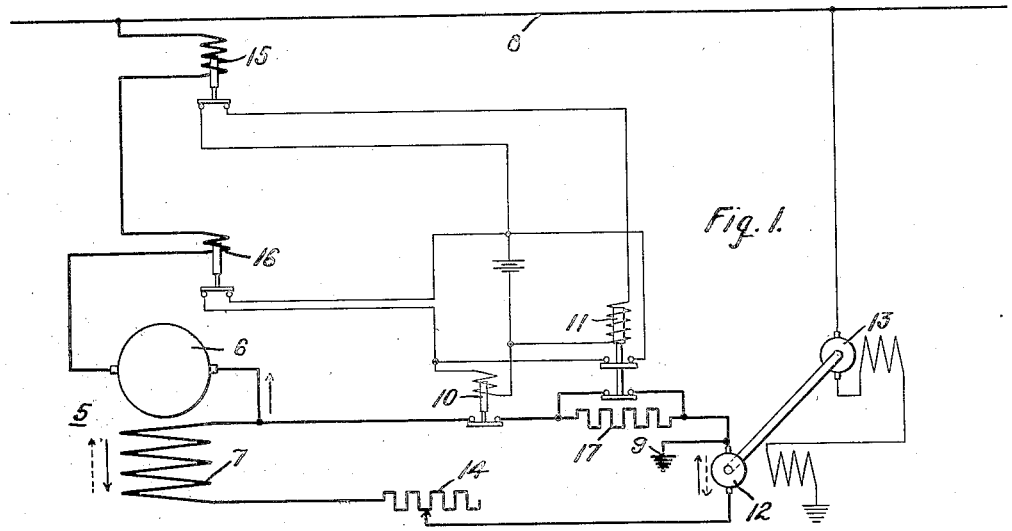
Figure 2:
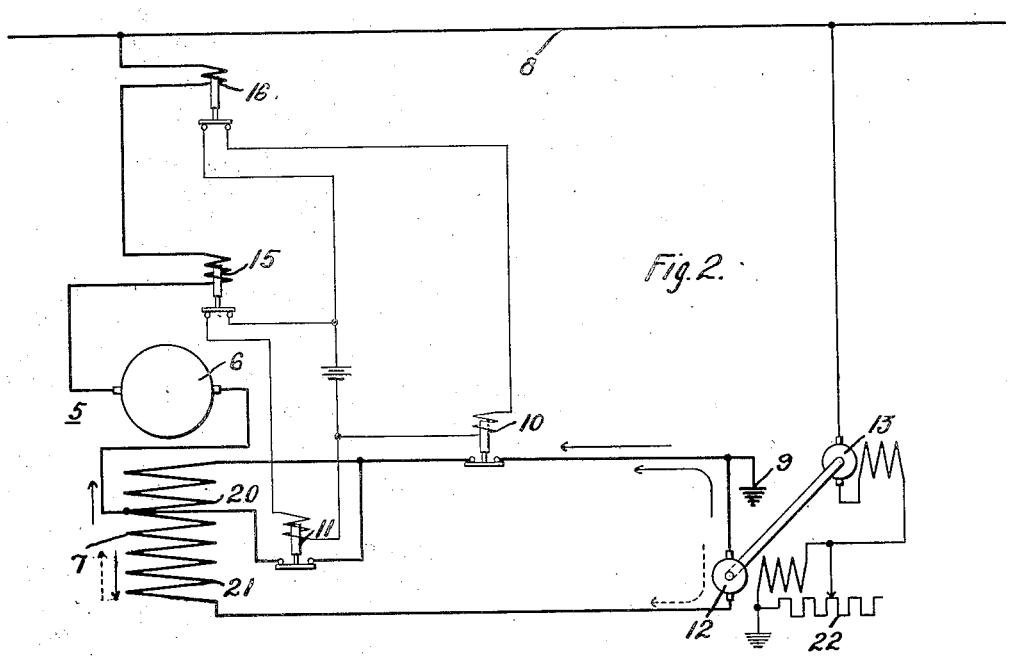
Figure 3:
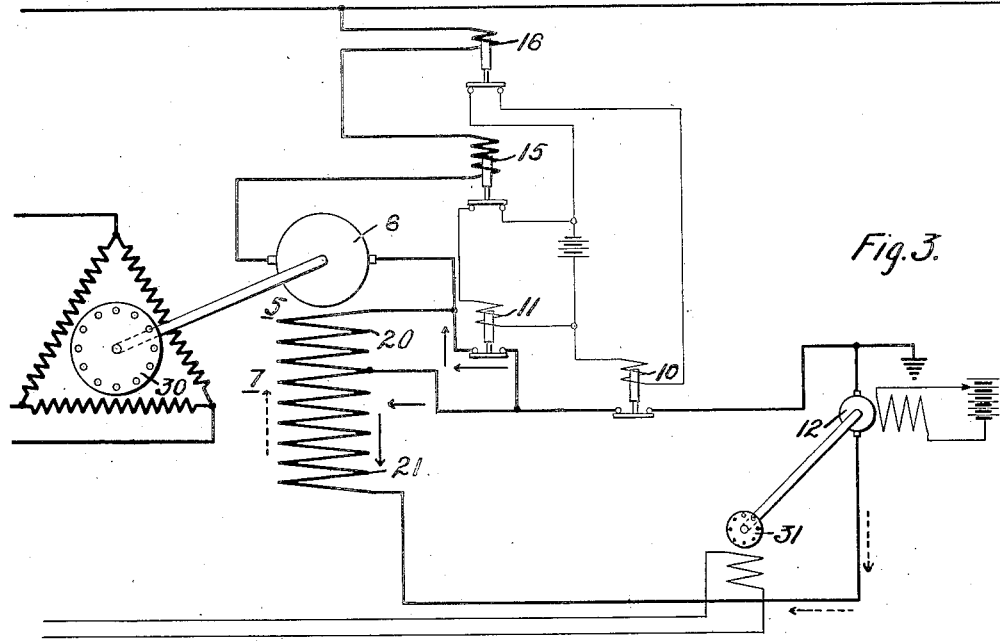
Figure 4:
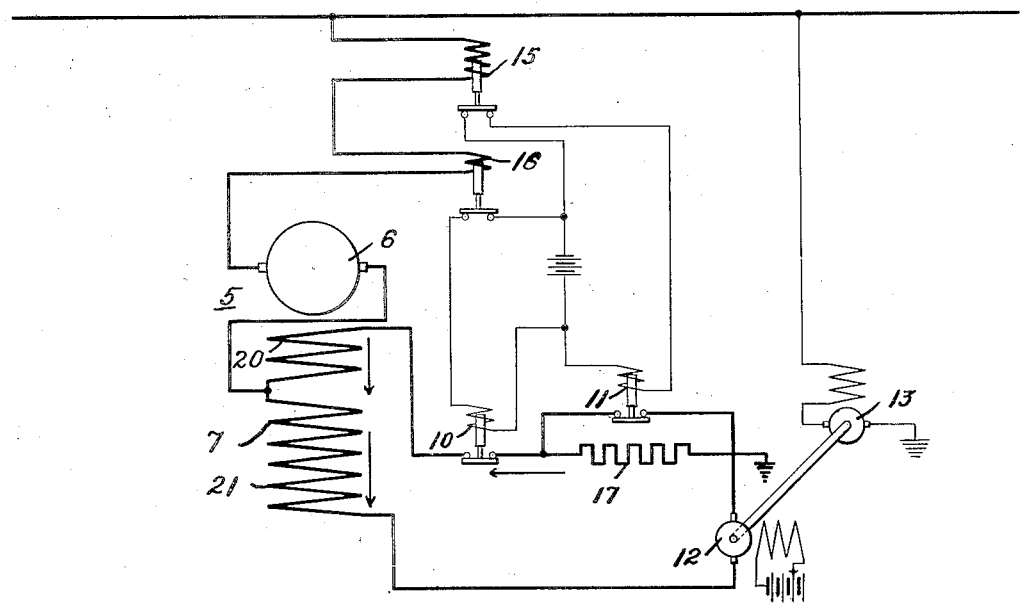

Referring to the accompanying drawing, Fig. 1 is a diagrammatic view of a direct-current generator, together with suitable exciting and auxiliary apparatus, embodying one form of my invention; and Figs. 2, 3 and 4 are views similar to Fig. 1 and embodying modifications in the system thereof.

Referring to Fig. 1, a generator is shown at 5 comprising an armature 6 and an exciting field winding 7. The generator 5 may be driven by any suitable means, either a prime mover or an alternating-current motor, if employed in a substation. In the particular instance shown, energy is supplied to a railway system, and one terminal of the generator 5 is, therefore, connected to a trolley wire 8 and the other terminal is grounded, as at 9, through the contact members of suitable electromagnetic switches 10 and 11.

During normal operation, the field winding 7 is arranged for separate excitation from an exciter machine 12 driven by any suitable means such, for example, as a motor 13. The current from the exciter machine to the field winding 7 also passes through the contact members of the switches 10 and 11 and through an adjustable resistor 14, whereby the excitation may be adjusted.

The operating coils of suitable limit switches 15 and 16 are inserted in series with the armature 6, and the switch 15 is arranged to open upon a small degree of overload, whereas the limit 16 is arranged to open upon a greater degree of overload. The different degrees of sensitiveness are indicated by providing operating coils for the respective limit switches having different numbers of turns. The limit switch 15, upon opening, is arranged to de-energize the coil of switch 11, thus inserting a resistor 17 in circuit with the field winding 7 and also in circuit with the armature 6. In like manner, the limit switch 16, upon opening, de-energizes the coil of switch 10, whereby the current of the armature 6 is caused to traverse the field winding 7 and the exciter 12. The coil of the switch 11 may further be energized through an "UP" interlock on the switch 11, whereby the switch 10 cannot respond to the opening of the limit switch 16 unless the switch 11 is first opened.

Having thus described the arrangement of the circuits of Fig. 1, the operation thereof is as follows. During normal operation, the exciter machine 12 causes current to flow through the local exciting circuit, said current flowing downwardly through the field winding 7 and upwardly through the exciter armature 12, as indicated by the full-line arrows, this exciting current imparting a substantially flat voltage characteristic to the machine 5. At the same time, the load current of the machine 5 flows upwardly to the trolley wire 8, thus traversing the contact members of the switch 11 in the same direction as the exciting current.

If the load current of the machine 5 exceeds a predetermined small degree of overload, the limit switch 15 opens, thereby opening the energizing circuit of the switch 11 and removing the short circuit across the resistor 17, and causing both the exciting current and the load current to traverse said resistor. As said two currents are flowing in the same direction through the resistor, the relatively large IR drop produced therein will act as an electromotive force in opposition to the electromotive force of the exciter machine 12, thus producing a marked reduction in the excitation of the machine 5 and a consequent reduction in the current given out thereby. It should still further be noted that, if said overload varies in amount, the IR drop in the resistor 17 varies in like amount, causing an inverse or complementary variation in the excitation of the field winding 7 and imparting a negative compound characteristic to the machine 5, thus further protecting said machine from excessive current overloads.

A generator having a negative compound characteristic is one in which the terminal voltage inherently drops rapidly as the current is increased, thus approaching the conditions of constant current operation. Generators having a substantially flat voltage-current characteristic are generally recognized as being of the constant-voltage type, while generators having a steep drooping characteristic are classed as constant-current machines, since they deliver a current which varies only slightly for large variations in the load resistance.

The decreased load current of the machine 5 which results may be sufficient to permit the limit-switch 15 to open and thus cause the switch 11 to close, and this cycle of operation is rapidly repeated with a persistent overload on the line 8. With a transient overload, the entire system shown immediately reassumes its normal condition.

If desired, a plurality of switches 11 may be provided, operable at different degrees of overload and cutting in proportional parts of the resistor 17, whereby operation may be secured on any one of a plurality of falling characteristics, depending upon the degree of overload.

If the current overload of the machine 5 exceeds a still greater predetermined amount, the switch 16 opens, thereby causing the switch 10 to open the separate exciting circuit. Load current from the ground at 9 flows downwardly through the exciter armature 12 and upwardly through the exciting winding 7 to the armature 6, as indicated by the dotted arrows, thus temporarily reversing the direction of current flow through the field winding 7 and quickly causing the electromotive force of the machine 5 to fall below the voltage of the line 8. Current thereupon flows from the line 8 to ground, maintaining the field of the winding 7 in its original direction but causing the machine 5 to operate as a series motor. If the speed of the machine 5 be substantially fixed, as by an alternating-current driving motor, as is usual in substation work, the resultant motoring current is not harmful, otherwise, an over-speed device may be employed to prevent the machine 5 from running away, as is common, for example, in rotary-converter practice.

Turning now to the form of my invention shown in Fig. 2, the general arrangement is as in Fig. 1, with certain exceptions, and corresponding parts are similarly designated. The resistor 17 is eliminated and, in lieu thereof, the switch 11 is connected to short-curcuit a portion 20 of the field winding 7, the remainder of the field winding being designated as 21. The two portions 20 and 21 of the winding 7 are wound in opposition to each other, for purposes hereinafter described. The armature 6 is also connected at a point between the portions 20 and 21 of the field winding 7. The control rheostat 14 is eliminated from the exciting circuit, its function being performed by a rheostat 22 arranged to shunt current from the exciting field of the exciting machine 12.

During normal operation, the portion 20 of the field winding 7 is de-energized, being short-circuited by the switch 11, and the operation of the field winding 21 is similar to that described in connection with Fig. 1, the exciting and load currents flowing in the direction indicated by the full-line arrows.

Upon the occurrence of a predetermined small overload, the switch 15 opens to de-energize the switch 11 and cause both the exciting and the load current to traverse the portion 20 of the field winding 7 in a downward direction. Thus, the portion 20 of the field winding 7 serves a double function in that it acts exactly as did the resistor 17 in the system of Fig. 1 in setting up an IR drop in opposition to the electromotive force of the exciter machine 12 and further produces a magnetomotive force in opposition to that of the field winding portion 21, thus even more effectually reducing the excitation and the output voltage of the machine 5.

Upon the occurrence of a still greater predetermined degree of overload, the switch 16 opens to cause the switch 10 to open and temporarily cause the load current of the machine 5 to flow downwardly through the exciter machine 12 and upwardly through the winding 7, as indicated by the dotted arrows, thus reversing the main excitation and "killing" the machine 5, as before.

Referring to the system of Fig. 3, the machine 5 comprises an armature 6 and an exciting field winding 7, as before, the exciting field winding being divided into portions 20 and 21. Both the machine 5 and the exciter machine 12 are driven at substantially constant speed, as by induction motors 30 and 31, as is usual in substation practice. The switch 10, which is open under heavy overload, is connected directly between the exciter machine 12 and an intermediate point in the exciter field winding 7, while the armature 6 is connected directly to the upper terminal of the field winding portion 20. The small-overload switch 11 is connected across the terminals of the field winding portion 20.

In operation, the machines 5 and 12 tend to operate at substantially constant speed by virtue of their specific driving means and thus there is no tendency to over-voltage because of excessive speed. During normal operation, the load current flows upwardly through the switch 11, and the exciter current flows downwardly through the field winding portion 21, as indicated by the full-line arrows.

Upon the occurrence of a small overload, the switch 15 opens, whereby the switch 11 is opened to cause the load current to traverse the field winding portion 20, tending to demagnetize the field winding portion 21 and radically reducing the total excitation of the machine 5. It will be particularly noted, however, that the IR drop, in traversing the field winding portion 20, is not included in the exciting circuit and, therefore, the field-winding portion 20 does not function as the resistor 17 of Fig. 1 in imparting a negative compound characteristic to the machine 5.

Upon the occurrence of a heavier overload, the switch 16 opens, whereby the switch 10 opens to cause the load current to traverse both portions of the field winding 7 in the same direction, as indicated by dotted arrows, thus producing a very powerful reversed magnetomotive force.

The systems described to this point have embodied machines having normally flat voltage characteristics but, obviously, the same principle may be employed in causing a machine having a rising voltage characteristic to exhibit a drooping voltage characteristic under no-load conditions. Thus, in the system of Fig. 4, the combined load and exciting field current, under normal conditions, traverses the contact members of the switch 11, in shunt to the resistor 17 as in Fig. 1, and thence flows to an intermediate point in the field winding 7, all as indicated in the full-line arrows. The portions 20 and 21 of the field winding 7 are so wound that, under these normal conditions, their effect is cumulative and thus a positive compounding effect is produced in the machine 5.

Upon the occurrence of a small overload, the switch 11 is opened and the IR drop of the resistor 17 is sufficient, in its negative compounding effect, to more than wipe out the positive compounding effect of the field winding portion 20, whereby a negative compounding effect is produced for the generator 5. The subsequent occurrence of a heavy overload causes the load current to traverse the field winding 21, thus quickly reducing the field.

While I have shown my invention in a plurality of forms, it will be obvious to those skilled in the art that it is not so limited but is susceptible of various minor changes and modifications without departing from the spirit thereof and I desire, therefore, that only such limitations shall be placed thereupon as are imposed by the prior art or are specifically set forth in the appended claims.

I claim as my invention:

1. The combination with a generator provided with an exciting field winding, of an exciting source connected to said field winding, a load circuit connected to said generator, and automatic means whereby, if the load current delivered to said load circuit exceeds a predetermined amount, an electromotive force which is inherently dependent upon the load current is developed in the circuit of said field winding in opposition to the electromotive force of said exciting means.

2. The combination with a generator provided with an exciting field winding, of an exciting source connected to said field winding, a load circuit connected to said generator, and means whereby, if the load current delivered to said load circuit exceeds a predetermined amount, an electromotive force is automatically introduced and developed in the circuit of said field winding in opposition to the electromotive force of said exciting means, said opposing electromotive force varying in substantial accordance with said load current.

3. The combination with a generator provided with an exciting field winding, of an exciting source connected to said field winding, a load circuit connected to said generator, means whereby, if the load current delivered to said load circuit exceeds a predetermined amount, an electromotive force is developed in the circuit of said field winding in opposition to the electromotive force of said exciting means, and means whereby if said load current exceeds a still greater predetermined amount, the excitation of said field winding is reversed in direction.

4. The combination with a generator provided with an exciting field winding, of an exciting source connected to said field winding, a load circuit connected to said generator, means whereby, if the load current delivered to said load circuit exceeds a predetermined amount, an electromotive force is developed in the circuit of said field winding in opposition to the electromotive force of said exciting means, said opposing electromotive force varying in substantial accordance with said load current, and means whereby, if said load current exceeds a still greater predetermined amount, the excitation of said field winding is reversed in direction.

5. The combination with a load circuit, of a direct-current generator connected thereto and provided with an exciting field winding, a source of exciting electromotive force connected to said field winding, a resistor connected in said load circuit and in said exciting circuit, and means dependent upon the load current whereby said resistor is normally short-circuited, said short-circuiting means being rendered inoperative if the current of said load circuit exceeds a predetermined amount, the connections being such that the IR drop of the load current in said resistor is opposed and subordinate to said field-exciting electromotive force.

6. The combination with a generator provided with exciting field turns, of a load circuit connected thereto, and means for automatically establishing series motor connections of the generator windings when the current delivered to the load circuit assumes predetermined characteristics.

7. The combination with a compound-wound generator for supplying energy to a load circuit and provided with a series field winding disposed to be differentially effective relative to the main series winding, of a switch normally short-circuiting the differential winding, an electromagnet normally holding the switch in closed position and an overload relay for controlling the circuit of the electromagnet.

8. The combination with a direct-current circuit and a generator for supplying energy thereto provided with a winding for normally establishing a field flux in one direction, of means external of the generator for energizing said winding, a second winding disposed to be differentially effective relative to the first winding, a switch normally short-circuiting said differential winding, electromagnetic operating means normally energized to maintain said switch in such position and means responsive to the current transferred between the generator and the circuit for controlling said electromagnetic means.

9. The combination with a direct-current circuit and a generator for supplying energy thereto provided with a winding for normally establishing a field flux in one direction, of means external of the generator for energizing said winding, a second winding disposed to be differentially effective relative to the first winding, a switch, an electromagnet energized from a source other than the generator for normally maintaining the switch closed to short-circuit the differential winding, a switch in the circuit of the electromagnet and means energized in accordance with the current transferred between the generator and the load circuit for actuating the last-mentioned switch.

In testimony whereof, I have hereunto subscribed my name this 28th day of March, 1918.

RUDOLF E. HELLMUND.